US011952277B2

United States Patent
Eurlings (10) Patent No.: US 11,952,277 B2
(45) Date of Patent: Apr. 9, 2024

(54) CONVERSION OF SOLID WASTE INTO SYNGAS AND HYDROGEN

(71) Applicant: RWE GENERATION NL B.V., Geertruidenberg (NL)

(72) Inventor: Johannes Theodorus Gerardus Marie Eurlings, Obbicht (NL)

(73) Assignee: RWE GENERATION NL B.V., Geertruidenberg (NL)

( * ) Notice: Subject to any disclaimer, the term of this patent is extended or adjusted under 35 U.S.C. 154(b) by 0 days.

(21) Appl. No.: 18/250,458

(22) PCT Filed: Oct. 25, 2021

(86) PCT No.: PCT/EP2021/079462
§ 371 (c)(1),
(2) Date: Apr. 25, 2023

(87) PCT Pub. No.: WO2022/090118
PCT Pub. Date: May 5, 2022

(65) Prior Publication Data
US 2023/0303393 A1    Sep. 28, 2023

(30) Foreign Application Priority Data

Oct. 29, 2020    (EP) ..................... 20204801

(51) Int. Cl.
*C01B 3/56*    (2006.01)
*C01B 3/12*    (2006.01)
*C10J 3/46*    (2006.01)
*C10L 9/08*    (2006.01)

(52) U.S. Cl.
CPC .................. *C01B 3/56* (2013.01); *C01B 3/12* (2013.01); *C10J 3/466* (2013.01); *C10L 9/083* (2013.01);
(Continued)

(58) Field of Classification Search
CPC ..... C01B 3/56; C01B 3/12; C01B 2203/0283; C01B 2203/043; C01B 2203/0475;
(Continued)

(56) References Cited

U.S. PATENT DOCUMENTS

| | | |
|---|---|---|
| 2011/0124748 A1 | 5/2011 | Kuku |
| 2011/0179701 A1 | 7/2011 | Grassi |

FOREIGN PATENT DOCUMENTS

| | | |
|---|---|---|
| DE | 19608093 A1 | 9/1997 |
| JP | H0952079 A | 2/1997 |
| WO | 2016128994 | 8/2016 |
| WO | 2019054868 | 3/2019 |

OTHER PUBLICATIONS

M. Shahabuddin, Bhavya B. Krishna, Thallada Bhaskar, Greg Perkins—Advances in Thermo-chemical Production of Hydrogen from Biomass and Residual Wastes: Summary of Recent Techno-economic Analyses—Bioresource Technology—Mar. 2020—vol. 299—Elsevier Ltd.
(Continued)

*Primary Examiner* — Jafar F Parsa
(74) *Attorney, Agent, or Firm* — Lott & Fischer, PL (57) ABSTRACT

The method and plant (1) for conversing solid recovered fuel pellets (117) made from municipal solid waste (103) allow the transformation of the municipal solid waste (103) into hydrogen with a high yield instead of landfilling or incinerating the municipal solid waste (103). The hydrogen rich product gas stream (601) can be used as feedstock for chemical reactions or for storing energy in a releasable manner.

9 Claims, 7 Drawing Sheets

(52) U.S. Cl.
CPC ............... *C01B 2203/0283* (2013.01); *C01B 2203/043* (2013.01); *C01B 2203/0475* (2013.01); *C01B 2203/0485* (2013.01); *C10J 2300/0906* (2013.01); *C10J 2300/0909* (2013.01); *C10J 2300/0946* (2013.01); *C10L 2290/04* (2013.01); *C10L 2290/08* (2013.01); *C10L 2290/10* (2013.01); *C10L 2290/28* (2013.01)

(58) Field of Classification Search
CPC ............... C01B 2203/485; C10L 9/083; C10L 2290/04; C10L 2290/08; C10L 2290/28; C10J 2300/0906
See application file for complete search history.

(56) References Cited

OTHER PUBLICATIONS

International Application No. PCT/EP2021/079462—Patent Cooperation Treaty PCT International Search Report—Completed Jan. 13, 2022 (dated Jan. 31, 2022).
International Application No. PCT/EP2021/079462—Patent Cooperation Treaty PCT Written Opinion of the International Searching Authority—Completed Jan. 13, 2022 (dated Jan. 31, 2022).
European Search Report for Application No. EP 20 20 4801—dated Mar. 23, 2021.
European Search Opinion for Application No. EP 20 20 4801—dated Mar. 23, 2021.
P.H. Wallman et al.—Hydrogen Production from Wastes—Pergamon—Elsevier Science Ltd.—Jul. 1997—Energy vol. 23, No. 4, pp. 271-278—Printed in Great Britain.

CONVERSION OF SOLID WASTE INTO SYNGAS AND HYDROGEN

This application is a national phase of PCT Application No. PCT/EP2021/079462 filed Oct. 25, 2021, the contents of which are hereby incorporated by reference.

Subject matter of the present invention is the conversion of solid waste, like municipal solid waste and/or biomass in the form of solid recovered fuel (SRF) pellets to a product stream rich in hydrogen, preferably into pure hydrogen.

Municipal Solid Waste (MSW) is generated worldwide and has to be dealt with. In the western hemisphere municipal solid waste is either landfilled or incinerated. Incineration is focused on maximizing the use of the energy content of the municipal solid waste in contrast to recycling or reusing the contents of the municipal solid waste on a molecular scale as e.g. in chemical recycling. Incineration generates issues regarding the emission of pollutants into the atmosphere which results—depending on national or even local legislation—in significant technological efforts necessary to meet the limitations provided by national/local legislation. Further, the products generated by the incineration, e.g. fly ash, bottom ash, gypsum and heavy metal and/or dioxin laden active coal, create further challenges regarding their further use and/or processing. Furthermore, the waste to power efficiency, i.e. the amount of caloric value transferred to heat energy is low and is typically in a range of only 20 to 25%.

Based on this the object of the present invention is to overcome the drawbacks known from prior art.

This object is solved by the features of the independent claims. The respective dependent claims are directed to further embodiments of the invention. Further embodiments can be deducted from the specification including the figures and the respective description of the figures.

The method for processing solid recovered fuel pellets according to the present invention, comprises the following steps:
  a) torrefaction of the pellets at a torrefaction temperature of 250° C. to 300° C. generating charred pellets and torrefaction gas, step a) preferably performed in a torrefaction unit as described below;
  b) milling the charred pellets in a first milling step to coarsely milled charred pellets, step b) preferably performed in a second mill as described below;
  c) removing metal residues from the coarsely milled charred pellets, step c) preferably performed using a third metal removal unit as described below;
  d) milling the coarsely charred pellets to finely milled charred pellets, step d) preferably performed in a third mill as described below;
  e) gasifying the finely milled charred pellets to raw syngas in an entrained flow gasifying process, step e) preferably performed in a gasification unit as described below;
  f) performing CO shift reactions to the raw syngas creating shifted syngas, step f) preferably performed in a CO shift unit as described below;
  g) removing carbon dioxide and hydrogen sulfide from the shifted syngas creating a syngas; and
  h) generating a product gas stream rich in hydrogen by purifying the syngas, step g) and h) preferably performed in a gas cleaning unit as described below.

The steps a) to h) are performed according to the invention in the order mentioned, i.e. first step a), then step b), then step c), then step d), and so forth. The term torrefaction in step a) is understood as a thermochemical treatment of the solid recovered fuel pellets at temperatures of 250° C. to 320° C. It is carried out under atmospheric pressure and without adding further oxygen, e.g. without providing air. During the torrefaction process water contained in the solid recovered fuel pellets evaporates as do volatiles included in the solid recovered fuel pellets. Biopolymers included in the solid recovered fuel pellets partly decompose under release of volatiles. The product of the torrefaction process are charred pellets and torrefaction gas.

The term hydrogen rich gas stream or a gas stream rich in hydrogen is understood as a gas that comprises at least 90 vol.-% hydrogen, preferably at least 95 vol.-% hydrogen, in particular at least 99.5 vol.-% hydrogen. The remaining amount comprises argon (Ar), nitrogen ($N_2$), carbon monoxide (CO) and carbon dioxide ($CO_2$). Preferably, in step g) and h) first, via adsorption, carbon dioxide and hydrogen sulfide are removed, thereafter, second, via a pressure swing adsorption (PSA) process, hydrogen is separated from the remaining as to form the product gas stream rich in hydrogen with a hydrogen content of, preferably, at least 99.5% vol.-%.

Preferably, the solid recovered fuel pellets are produced from municipal solid waste, possibly with added biomass, preferably as disclosed below in connection with the pelletizing facility, in particular referring to FIGS. 1 and 3. In the process as described most metal residues are removed from the waste before producing the solid recovered fuel pellets. Nevertheless, it is possible that this does not remove metal residues in its entirety. Therefore, after step b) in step c) the amount of metal residues in the charred pellet is further reduced. As an eddy current technology is applied, both iron and non-iron metal residues can be removed from the coarsely milled charred pellets.

In step b) the milling process is performed to generate a first particle distribution having a first maximum particle size of preferably 10 mm [millimeters] and less. In step d) the milling process is preformed to generate a second particle distribution having a second maximum particle size being significantly smaller than the first maximum particle size. Preferably, the second maximum particle size is 350 μm [micrometers]. The second maximum particle size is preferably chosen to allow an efficient entrained flow gasification in step e). This allows both an efficient removal of metal residues in step c) and an efficient entrained flow gasification in step e).

The entrained flow gasification in step e) is, preferably, performed using a full water quench on the syngas generated during the entrained flow gasification. The quench results in any solids even in the molten state included in the syngas are solidified and are collected as slag in the process. The quench water is used cyclical, i.e. preferably no water is discharged from the system. The waste water of the process is treated and evaporated eventually producing sodium chloride (NaCl) as a by-product. The condensate is reused in the process as process make-up water.

The method according to the present invention allows a chemical recycling of municipal solid waste generating hydrogen which can be used as feedstock in chemical processes and/or for storing energy.

According to an embodiment the torrefaction gas generated in step a) is thermally cracked for the generation of a torrefaction syngas, said torrefaction syngas being mixed with the raw syngas generated in step e) before step f).

The thermal cracking of the torrefaction gas is performed in a torrefaction gas processing unit which is described in detail below, in particular referring to FIG. 4. Thermal cracking is preferably performed using a substoichiometric oxidization process for cracking long hydrocarbons possibly present in the torrefaction gas and/or the fuel gas used for the thermal cracking. Preferably, an oxygen rich gas stream with 95 vol.-% oxygen, preferably pure oxygen, is used in the thermal cracking process. With the thermal cracking of the torrefaction gas the torrefaction syngas can be used for chemical recycling as well, instead of burning the same.

According to an embodiment in step b) the charred pellets are milled to a particle size of 10 mm and less. This allows an efficient removal of the metal residues in step c). Step b) is preferably performed in a second mill as described below.

According to an embodiment in step c) the metal residues are removed using an eddy current technology. The eddy current is applied in such a manner, that both iron and non-iron metal residues are removed. Step c) is preferably performed using a third metal removal unit as described below.

According to an embodiment in step d) the coarsely milled charred pellets are milled to a particle size of 500 μm [micrometer] and less. This allows an efficient entrained flow gasification of the finely milled charred pellets. It is possible to add milled biomass to the finely milled charred pellets before performing the entrained flow gasification as is described below. Step d) is preferably performed in a third mill as described below.

According to an embodiment in step g) carbon dioxide ($CO_2$) and hydrogen sulfide ($H_2S$) are removed from the syngas by adsorption. The respective carbon dioxide is purged from the respective at least one adsorber and is used as feedstock for chemical processes or is purged to the ambient. Hydrogen sulfide is converted into elementary Sulphur using a Claus process. The respective Claus unit offgases are hydrotreated and recycled to the respective adsorber.

According to an embodiment in step g) hydrogen is separated from the syngas using pressure swing adsorption (PSA) creating the product gas stream rich in hydrogen and a purge gas.

According to an embodiment at least a part of the purge gas is provided to the CO shift reaction in step e). This allows an increase in the conversion efficiency in the CO shift unit and increases the total hydrogen yield.

According to an embodiment, a part of the purge gas is used as fuel gas.

The purge gas comprises at least one of carbon monoxide (CO), carbon dioxide ($CO_2$), nitrogen ($N_2$), hydrogen ($H_2$) and argon (Ar).

According to another aspect of the invention a plant for the processing of solid recovered fuel pellets to a product gas stream rich in hydrogen is proposed, comprising
 a torrefaction unit for torrefying the solid recovered fuel pellets to charred pellets;
 a second mill for milling the charred pellets to coarsely milled charred pellets;
 a third metal removal unit comprising an eddy current for removing metal residues from the coarsely milled charred pellets;
 a third mill for milling the coarsely milled charred pellets to finely milled charred pellets;
 a gasification unit comprising an entrained flow gasifier for gasifying the finely milled charred pellets to raw syngas;
 a CO shift unit for performing CO shift reactions to the raw syngas creating shifted syngas;
 a gas cleaning unit comprising adsorbing means for removing carbon dioxide and hydrogen sulfide from the shifted syngas and a hydrogen separator for separating hydrogen from a purge gas generating a product gas stream rich in hydrogen.

According to an embodiment the plant further comprises a torrefaction gas processing unit for thermally cracking torrefaction gas generatable in the torrefaction unit.

According to an embodiment the hydrogen separator comprises a pressure swing adsorption system.

It should be noted that the individual features specified in the claims may be combined with one another in any desired technologically reasonable manner and form further embodiments of the invention. The specification, in particular taken together with the figures, explains the invention further and specifies particularly preferred embodiments of the invention. Particularly preferred variants of the invention and the technical field will now be explained in more detail with reference to the enclosed figures. It should be noted that the exemplary embodiment shown in the figures is not intended to restrict the invention. The figures are schematic and may not be to scale. The figures display:

Figure 1:
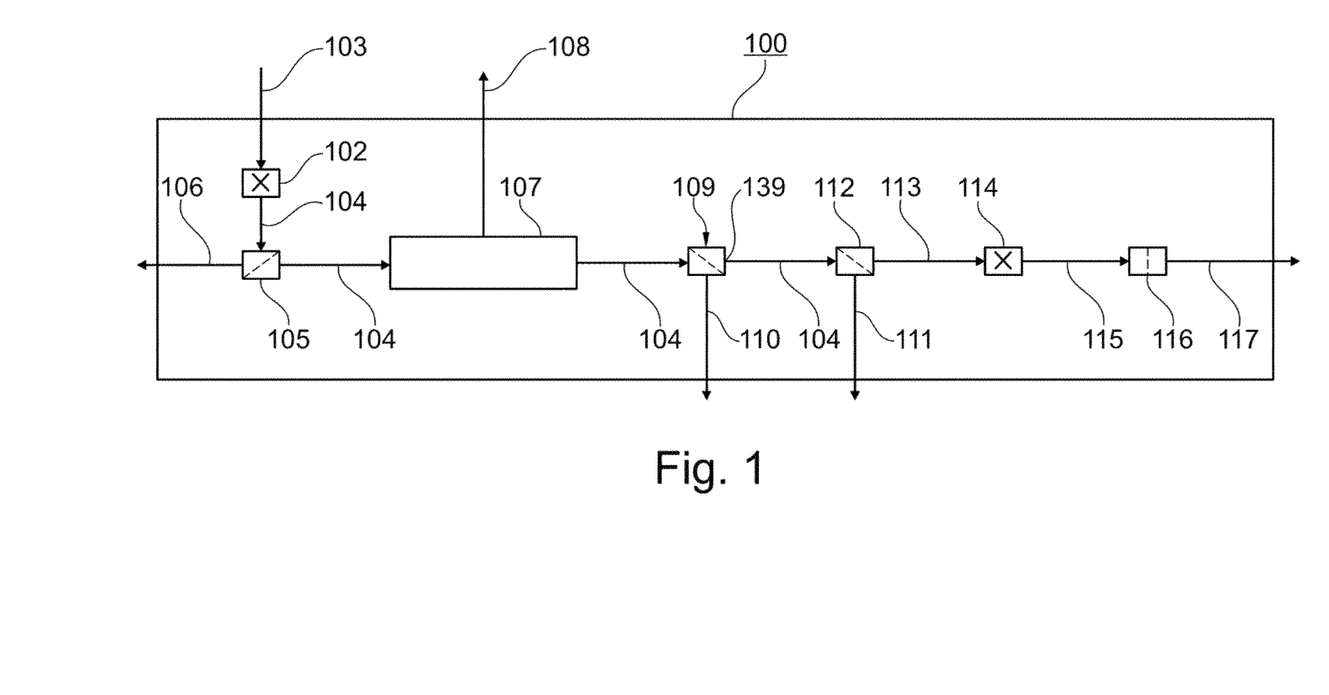
FIG. 1 an example of a plant for conversing solid waste into a product gas stream comprising hydrogen.

FIG. 1 displays schematically a pelletizing facility 100 in which solid recovered fuel pellets 117 manufactured in the pelletizing facility 100 are provided to a plant 1 for conversing solid waste into a gas comprising hydrogen, in particular into syngas comprising hydrogen and hydrogen. After preparing pellets from solid waste like municipal solid waste 103 and/or biomass in the pelletizing facility 100 the respective pellets 117 are transported to the plant 1 and are provided to a torrefaction unit 200 in which the pellets are oxidized substoichiometrically at temperatures of 250° C. to 300° C. The torrefaction of the pellets results in charred pellets 201, which are gasified in a gasification unit 300. Another product of the torrefaction is torrefaction gas 202 which is provided to a torrefaction gas processing unit 400 which is discussed in detail with reference to FIG. 5 below. The product of the torrefaction gas processing unit 400 is a torrefaction syngas 401 and of the gasification unit 300 is a raw syngas 301. The torrefaction syngas 401 and the raw syngas 301 comprise water steam, carbon monoxide and hydrogen. Both raw syngas 301 and torrefaction syngas 401 are introduced into a CO shift unit 500 in which carbon monoxide (CO) is reacting with water steam ($H_2O$) to carbon dioxide ($CO_2$) and hydrogen ($H_2$):

$$CO+H_2O \leftrightarrow CO_2+H_2.$$

Shifted syngas 501 with increased hydrogen content compared to the syngases 301, 401 which is generated in the CO shift unit 500 and is transferred to a gas cleaning unit 600 which separates hydrogen from a purge gas 602 creating a product gas stream rich in hydrogen 601. The hydrogen content of the product gas stream rich in hydrogen 601 is at least 99.5 vol.-%. In the gas cleaning unit 600 carbon dioxide and hydrogen sulfide are separated from the remaining gas stream, creating a raw hydrogen stream which is fed to a pressure swing adsorption system which allows hydrogen to pass and absorbs all other molecules. By cyclic depressurizing while using multiple absorbers and purging with hydrogen. Purge gas is generated. Simultaneously, the product stream rich in hydrogen is produced with a hydrogen content of 99.5 vol.-% and more. The pelletizing facility 100 is preferably off-site, i.e. situated not in the same location than the plant 1 for conversing solid waste into a gas comprising hydrogen. The pelletizing facility 100 being off-site is advantageous, as it reduces the mass of the municipal solid waste, as usually about 30 to 35 wt.-% of water content of the municipal waste are evaporated. This reduces the mass to be transported significantly. Furthermore, the footprint of the chemical plants such as the plant 1 can be reduced as the pelletizing facility 100 allows a central production of solid recovered fuel pellets and the subsequent transport of these pellets to the chemical plant where needed.

Figure 2:
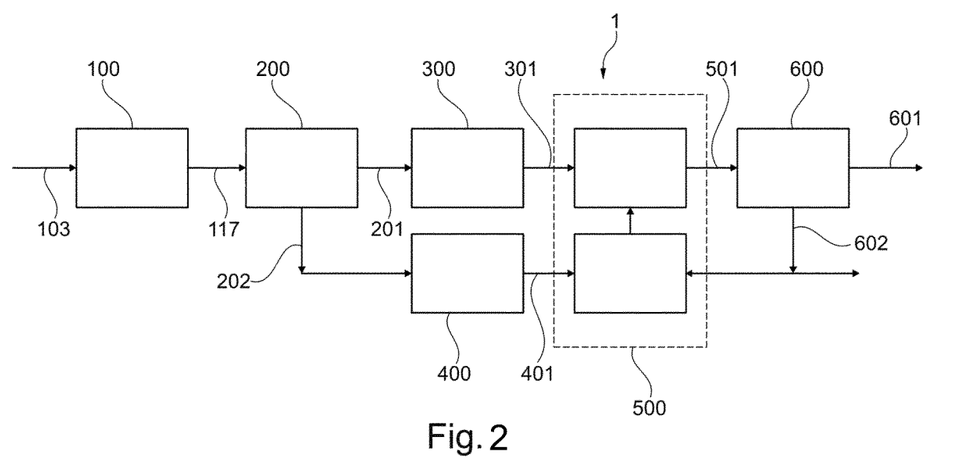
FIG. 2 a visualization of a pelletizing facility.

According to FIG. 2 a pelletizing facility 100 includes a shredder 102. Solid waste 103, e.g. municipal solid waste (MSW) with a possible addendum of biomass, are provided to the shredder 102, generating shredded solid waste 104 which is conveyed by a first metal removal unit 105 including a magnet to remove the iron residues 106 from the shredded solid waste 104. Thereafter, the shredded solid waste 104 is provided to a dryer 107 in which water 108 is removed from the shredded solid waste 104. The shredded solid waste 104 is then conveyed to a second metal removal unit 109 for removing metal residues 110 from the shredded solid waste 104, the second metal removal unit 109 comprising a second magnet 139 for further removing iron metals and an eddy current to remove non-iron metals.

Thereafter, minerals as well as stainless steel are removed as further residues 111 in a density classifier 112. In the density classifier 112 high density residues like stainless steel particles, that can neither be removed with a magnet nor an eddy current, are removed based on the density differences between the further residues 111 and the remainder of the shredded solid waste 104. Same holds for minerals like glass or stone that are removed from the remainder of the shredded solid waste 104 by virtue of its density difference. Preferred examples for density classifiers 112 are e.g. air classifiers.

After removal of the further residues 111 the shredded solid waste 104 has been stripped from the iron metals (such as iron residues 106 and metal residues 110), the non-iron metals, stainless steel and minerals as further residues 111 like as well as moisture in the form of water 108. The remainder of the shredded solid waste 104 is basically identical to the solid waste 103 that has been input to the pelletizing facility 100. In particular, in the present pelletizing facility 100 it is not necessary to sort out e.g. fine fractions of the solid waste 103 or chlorine containing materials like e.g. Polyvinyl chloride (PVC) or the like. This means the ratio of mass of the pre-cleaned material stream 113 which is present downstream of the first metal removal unit 105, the second metal removal unit 109, and the density classifier 112 to the mass of the solid waste 103 input into the pelletizing facility 1 is larger than for known approaches.

The pre-cleaned material stream 113 is thereafter milled in a first mill 114, in particular to mean particle sizes of less than 25 mm to generate a milled material stream 115. Subsequently, the milled material stream 115 is introduced to a pellet press 116 to generate solid recovered fuel pellets 117.

Figure 3:
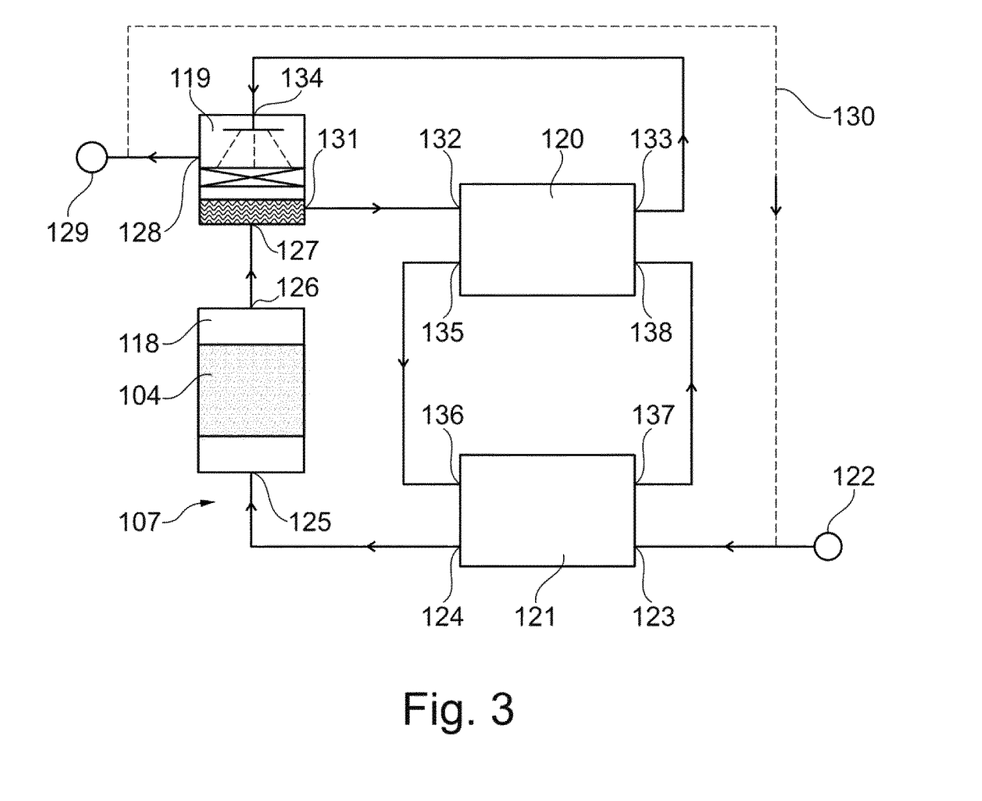
FIG. 3 an example of a dryer used in the pelletizing facility.

FIG. 3 displays an example of a dryer 107 used in a pelletizing facility 100 as in FIG. 1. The dryer 107 for drying shredded solid waste 104 comprises a kiln 118 for accommodating the shredded solid waste 104, a washing column 119 which also can be named a scrubber, a heat pump 120 and a radiator 121. Air is sucked into the dryer 107 through a dryer air inlet 122 which is usually fluidly connected with the atmosphere. The sucked in air can be conveyed to the radiator 121 via a vent which is not shown in FIG. 3. The dryer air inlet 122 is fluidly connected with a radiator air inlet 123 of the radiator 121 via a duct. The air conveyed into the radiator 121 is heated in the radiator 121 and exits the radiator 121 via a radiator air outlet 124. The heated air is conveyed towards the kiln 118, wherein a kiln air inlet 125 is fluidly connected with the radiator air outlet 124 via a duct. The shredded solid waste 104 is arranged inside the kiln 118 and the air conveyed into the kiln 118 flows through the shredded solid waste 104 and exits the kiln 118 via a kiln air outlet 126. The temperature of the air entering the kiln 118 in a drying process is approximately 80° C., wherein the air exiting the kiln 118 exhibits a temperature of about 45° C. The relative humidity of the air exiting the kiln 118 is approximately 100%.

The kiln 118 is in fluid communication with the washing column 119, wherein the kiln air outlet 126 is fluidly connected with a washing column air inlet 127. Inside the washing column 119 the air is brought into close contact with cold water. Thereby, the moist and warm air is cooled down so that the humidity of the air is condensed out and latent heat is transferred into sensible heat of the water. This results into a heating of the water from approximately 18° C. to approximately 25° C. to 28° C. and a cooling of the air from about 28° C. to 32° C. to approximately 22° C. to 24° C. The cooled air exits the washing column 119 via a washing column air outlet 128 which is in fluid communication with a dryer air outlet 129.

The air exiting the washing column 119 also can be conveyed to the dryer air inlet 122 via a recirculation line 130, so that the washing column air outlet 128 is fluidly connected with the dryer air inlet 122. A corresponding arrangement results in a lower energy consumption of the device 100. The recirculation line 130 is not necessarily included in the device 100 and can be left out.

With regard to the airflow the radiator 121 is positioned downstream of the dryer air inlet 122, the kiln 118 is positioned downstream of the radiator 121, the washing column 119 is positioned downstream of the kiln 118 and the dryer air outlet 129 is positioned downstream of the washing column 119.

The washing column 119 also comprises a washing column water outlet 131 which is fluidly connected with a first heat pump water inlet 132. A first heat pump water outlet 133 is fluidly connected with a washing column water inlet 134. Therefore, water is circulated between the washing column 119 and the heat pump 120. The water can be conveyed via a pump which is not shown in FIG. 3.

The water is heated in the washing column 119 via the air entering the washing column 119 via the washing column air inlet 127 and the heated water exits the washing column 119 via the washing column water outlet 131 and enters the heat pump 120 via the first heat pump inlet 132. The heat energy of the water entering the heat pump 120 then is transferred to another heat cycle which is realized between the heat pump 120 and the radiator 121. The water entering the heat pump 120 exhibits a temperature of about 26° C. to 28° C. and the water exiting the heat pump 120 via the first heat pump outlet 133 exhibits a temperature of approximately 18° C.

The first heat pump outlet 133 is fluidly connected with a washing column water inlet 134. Therefore, the water cooled inside the heat pump 120 enters the washing column 119 via the washing column water inlet 134. Therefore, a heat cycle between the washing column 119 and the heat pump 120 is realized, wherein thermal energy of the water exiting the washing column 119 is transferred via the heat pump 120 to a second heat cycle between the heat pump 120 and the radiator 121.

A second heat pump outlet 135 is fluidly and therefore thermally connected with a radiator water inlet 136 and a radiator water outlet 137 is fluidly and therefore thermally connected with a second heat pump inlet 138. The water is thereby conveyed via pumps which are not shown in FIG. 3 between the heat pump 120 and the radiator 121. Consequently, a second heat cycle is realized between the heat pump 120 and the radiator 121.

Thermal energy from water exiting the washing column 119 is transferred via the heat pump 120 to the radiator 121 and to air flowing through the radiator 121 from the radiator air inlet 123 to the radiator air outlet 124.

The pelletizing facility 100 according to the present invention allows the manufacture of solid recovered fuel pellets from municipal solid waste without separating parts of the municipal solid waste before starting the pelletizing process. Thus, a higher amount of the municipal solid waste can actually be used to manufacture solid recovered fuel pellets. The pelletizing facility 100 as well as the method according to the invention can be used in particular to manufacture solid recovered fuel pellets that can be used in the production of hydrogen and/or carbon dioxide enriched syngas by a torrefaction of the solid recovered fuel pellets with a subsequent gas treatment.

Figure 4:
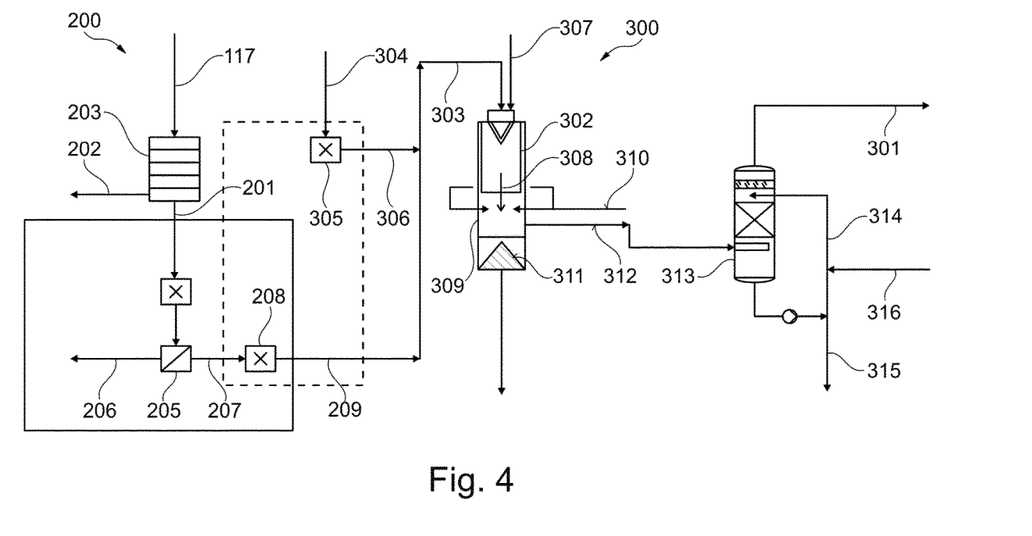
FIG. 4 a torrefaction unit and a gasification unit.

FIG. 4 displays an example of a torrefaction unit 200 and a gasification unit 300. In the torrefaction unit 200 solid recovered fuel pellets 117 are provided to a furnace 203 which is in this embodiment a multiple hearth furnace. In this furnace 203 the torrefaction of the solid recovered fuel pellets 117 take place. The term torrefaction is understood as a thermochemical treatment of the solid recovered fuel pellets 117 at temperatures of 250° C. to 320° C. It is carried out under atmospheric pressure and without adding further oxygen, e.g. without providing air. During the torrefaction process water contained in the solid recovered fuel pellets evaporates as do volatiles included in the solid recovered fuel pellets 117. Biopolymers included in the solid recovered fuel pellets 117 partly decompose under release of volatiles. The product of the torrefaction process are charred pellets 201 and torrefaction gas 202.

The torrefaction gas 202 is provided to the torrefaction gas processing unit 400 which is described below with reference to FIG. 5 The charred pellets 201 comprise charred plastic or organic parts and, possibly, metal inclusions as the metal parts of the solid recovered fuel pellets 117 are not charred in the torrefaction process. The charred pellets 201 are provided to a second mill 204 for coarse milling with particles sizes of 10 mm and less. Thereafter, in a third metal removal unit 205 which is based on an eddy current removal process metal residues 206 that have not been removed during the production of the solid recovered fuel pellets 117 are removed. Both iron and non-iron residues are removed by the third metal removal unit 205. The remaining coarsely milled charred pellets 207 are moved to a third mill 208 in which a fine milling process of the coarsely milled charred pellets 207 to finely milled charred pellets 209 with a particle size of 500 μm [micrometers] and less is taking place The finely milled charred pellets 209 are provided as feedstock 303 to the gasification unit 300 which comprises an entrained flow gasifier 302. Biomass 304, such as dried sludge, can be added to the finely milled charred pellets 209 after having been finely milled to a particle size in the same order of magnitude as the particle size of the finely milled charred pellets 209. The biomass 304 is milled in a respective fourth mill 305. The finely milled biomass 306 is then added to the feedstock 303 upstream of the entrained flow gasifier 302. Alternatively, but not shown in FIG. 4, the biomass 304 is milled together with charred pellets 201 and is, thus, introduced together with the charred pellets 201 into the second mill 204.

The feedstock 303 is provided to the entrained flow gasifier 302 together with an oxygen rich gas 307 having an oxygen content of at least 95 vol.-%, preferably at least 98 vol.-%, in particular 99.5 vol.-% and more. The gasification reactions take place in a dense cloud of very fine particles in co-current flow. The gasification takes place at temperatures of 2000° C. and pressures of 40 bar.

The resulting intermediary product gas 308 is provided into a quench zone 309 in which the resulting intermediary product gas 308 is quenched with quench water 310 of a temperature of preferably 180° C. to 220° C. Solids or melted solids solidify due to the quenching process and form slag 311 which can be removed to be used for civil construction. The generated raw syngas stream 312 is provided to a water washing cooling column 313 in which moisture included in the raw syngas 312 is condensing due to the contact with water 314 having a lower temperature of 180° C. to 200° C. than the raw syngas 312 having a temperature of around 214° C. The cooled and washed raw syngas 301 is provided to the CO shift unit 500. The excess bleed water 315 is provided to a slurry stripper (not shown) for removing gases from the excess bleed water 315. Make up water 316 is provided from the low temperature heat recovery unit 524 of the CO shift unit 500 described below.

Figure 5:
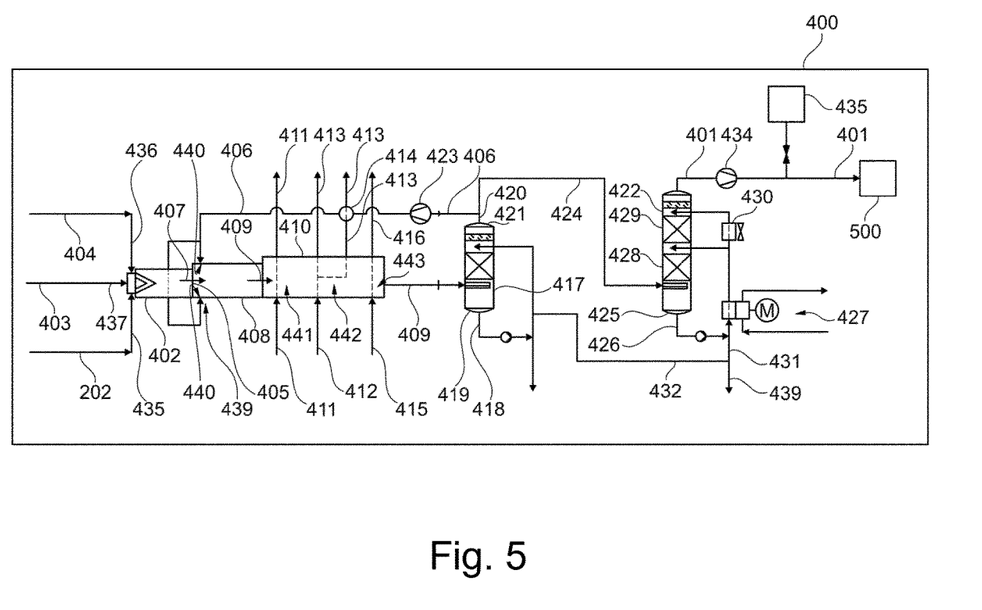
FIG. 5 a torrefaction gas processing unit.

FIG. 5 displays the torrefaction gas processing unit 400. Torrefaction gas 202 produced in the torrefaction unit 200 is introduced into a burning chamber 402. Furthermore, a fuel gas 403 and an oxygen rich gas stream 404 are introduced into the burning chamber 402. As the fuel gas 403 a natural gas and/or site fuel gas is used. A fuel gas comprises at least one of methane, ethane, nitrogen, and hydrogen. So called onsite fuel gas is e.g. generated in steam crackers. The oxygen rich gas stream 404 comprises at least 95 vol.-% [Volume-%] oxygen, preferably at least 98 vol.-%, in particular 99.5 vol.-% and more. In particular, if the gasification unit 300 is using a parallel entrained flow gasification pure oxygen is readily available, i.e. the oxygen rich gas stream 307 used in the gasification unit 300 can be provided from the same source as the oxygen rich gas stream 404. The burning chamber 402 has a first inlet 436 for introducing the oxygen rich gas stream 404, a second inlet 437 for introducing the fuel gas, and a third inlet 438 for introducing the torrefaction gas 202. The resulting raw syngas 301 is provided to the CO shift unit 500.

In the burning chamber 402 a substoichiometric oxidization takes place by which larger hydrocarbon molecules which originate from the torrefaction gases 202 and/or the fuel gas 403 are thermally cracked and transformed into a syngas 407 comprising carbon monoxide (CO), carbon dioxide ($CO_2$), hydrogen ($H_2$), and water ($H_2O$). Due to the high moisture content of typically at least 50 vol.-% of the torrefaction gases 202 the generation of elementary carbon and, thus, soot is suppressed.

The temperature in the burning chamber 402 is in the range of 1000° C. to 1200° C. After passing a burning chamber exit 405 the syngas 407 is quenched with recycled syngas 406 acting as quench gas to a temperature of 730° C. to 770° C., preferably to a temperature of 740° C. to 760° C., in particular of about 750° C. The syngas 407 is introduced into a mixing chamber 408 in which the quenching process and the accompanying mixing with the recycled syngas 406 is taking place resulting in a quenched syngas 409 which is cooling down in the mixing chamber 408. The quenching is permed in a quench zone 439 having inlets 440 for the recycled syngas 406. The effect of the quenching process, i.e. of the abrupt reduction of temperature due to the introduction of the cooler recycled syngas 406 is that any solids or melted solids being present in the syngas 407 are solidified. These solids can be introduced together with the torrefaction gas 202. Both the burning chamber 202 and the mixing chamber 408 are internally insulated and uncooled.

Downstream of the mixing chamber 408 the quenched syngas 409 is introduced into a heat recovery system 410 in which thermal energy or heat energy of the quenched syngas 409 is transferred to a thermal carrier 411, preferably a thermal oil, in a first heat exchanger 441. Downstream of the energy transfer to the thermal carrier 411 further thermal energy is transferred to boiler feed water 412 in a second heat exchanger 442 producing high-pressure steam 413 at least a part of which is transferred via a fourth heat exchanger 414 to heat the recycled syngas 406, preferably to a temperature of more than 200° C., in particular to about 225° C. In the heat recovery system 410 in a superheater 443 downstream the second heat exchange exchanger 441 with the boiler feed water 412 further thermal energy from the quenched syngas 409 is transferred to a low-pressure steam 415 to superheat the same generating superheated low-pressure steam 416. The thermal carrier is heated e.g. from a temperature of 300° C. to a temperature of 400° C. and can be used, e.g. for an indirect heating of the torrefaction unit 200. The high-pressure steam 413 has e.g. a pressure of 140 bar and a temperature of 350° C. when leaving the heat recovery system 410. The superheated low-pressure steam has a temperature of about 275° C. when leaving the heat recovery system 410 and is preferably used in the torrefaction process in the torrefaction unit 200. The quenched syngas 409 leaves the heat recovery system 410 with a temperature of about 170° C. and more to avoid the formation of ammonium chloride ($NH_4Cl$) which causes corrosion and/or fouling. To ensure that the temperature of about 170° C. is not undershot the boiler feed water 412 is introduced into the heat recovery system 410 of 140° C. and more.

Downstream of the heat recovery system 410 the quenched syngas 409 is introduced into a wet scrubbing system 417 to remove solids and halogens (mainly chlorides). The wet scrubbing system 417 is a common wet scrubbing column. Used washing water 418 is bled from a sump 419 of the wet scrubbing system 417. The used washing water 418 is transferred to a wastewater treatment facility (not shown) to be recycled. A cleaned syngas 420 is exiting the wet scrubbing system 417 a head 421 of the wet scrubbing system 417. A first part of the cleaned syngas 420 is used as the recycled syngas 406 and is as described above reheated and used in the quenching of the syngas 407. The use of the cleaned syngas 420 as the recycled syngas 406 reduces the concentrations of pollutants (like, e.g. solids, halogens, in particular chlorides) in the quenched syngas 409 and avoids damages, in particular corrosion, of the heat exchange surfaces in the heat recovery system, in particular a corrosion of the surfaces used to superheat the low-pressure steam 415 to the superheated low-pressure steam 416 is avoided. Simultaneously the high moisture content of 60 vol.-% and more increases the heat capacity of the recycled syngas 406 and, consequently, the cooling efficiency during the quenching process. The recycled syngas 406 is compressed by a compressor 423.

A second—i.e. the remaining—part 424 of the cleaned syngas 420 is introduced into a two stage water washing cooling column 422. Due to the close contact with the colder water in the column 422 the moisture in the syngas 424 is condensing. The respective condensing heat warms the washing water in the column 422. Washing water 426 from a sump 425 is provided to a heat pump 427 for cooling e.g. from a temperature of about 85° C. down to a temperature of 75° C. In the heat pump 427 low pressure steam is produced which is preferably used in the torrefaction unit 200 for process control. Most of the washing water 426 is introduced centrally in the column 422 being distributed both in a first stage 428 and a second stage 429 of the column 422. A smaller part of the washing water 426 is further cooled by an air cooler 430, preferably to temperatures of about 25° C. resulting in a temperature of the syngas 424 to a temperature of about 30° C. when leaving the column 422. The cooling of the syngas 422 removes about 60% of the mass as water. The excess washing water 431 is partly used as make up water 432 for the wet scrubbing system 417. Excess washing water 431 can be guided as bleed water 433 to a stripper system (not shown) in which gases are stripped from the bleed water 433, in particular ammonia ($NH_3$), carbon dioxide ($CO_2$) and hydrogen sulfide ($H_2S$) are stripped from the bleed water 433.

A syngas conveying means 434, preferably a fan or a blower, is used to convey torrefaction syngas 401 exiting the column 422 to the CO shift unit 500 (see FIG. 1) and/or to a flare 435. The syngas conveying means 434 creates an underpressure which pulls the quenched syngas 406 through the heat recovery system 410.

The torrefaction gas processing unit 400 allows the chemical recycling of torrefaction gas 202 produced by the torrefaction e.g. from solid recovered fuel (solid recovered fuel) pellets 117 without the need to burn the torrefaction gas 202.

Figure 6:
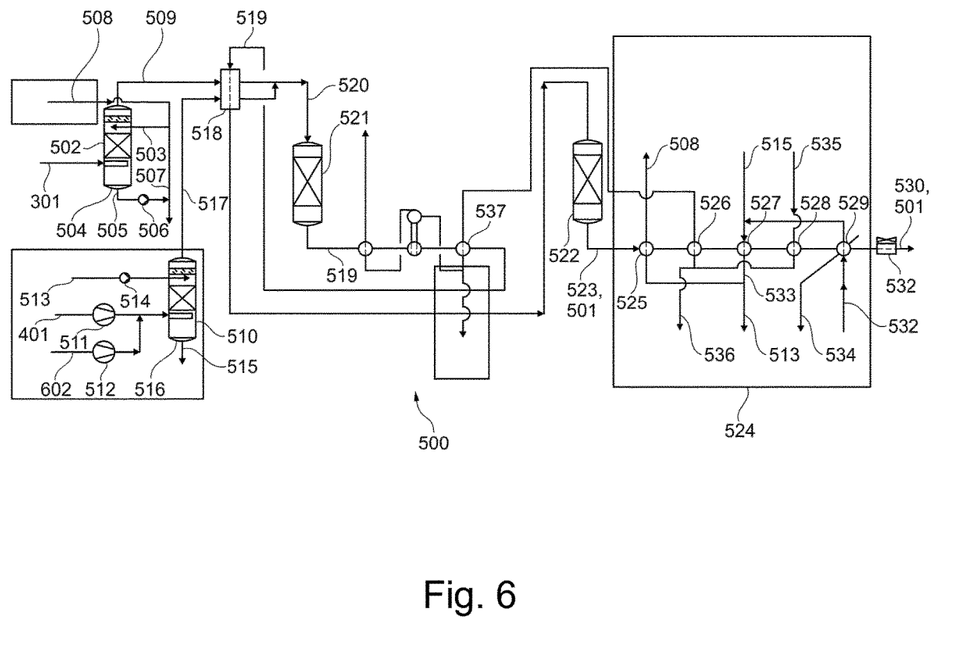
FIG. 6 a carbon monoxide (CO) shift unit.

FIG. 6 displays schematically a carbon monoxide (CO) shift unit 500 included in the plant 1. In a CO shift unit 500, a carbon monoxide (CO) shift reaction takes place in which carbon monoxide (CO) reacts with water ($H_2O$) to form carbon dioxide ($CO_2$) and hydrogen ($H_2$):

$$CO+H_2O \leftrightarrow CO_2+H_2$$

The reaction is in chemical equilibrium which can be influenced either in direction of the educts or the products in a usual way e.g. by use of the respective temperature and the use and concentration of a specific catalyst. As the reaction is endothermic the water is usually provided as water steam. To shift the chemical equilibrium to the product side to increase the production of hydrogen a molar steam to carbon monoxide ration of about 2.3 to 2.7, in particular about 2.5, has been found to be advantageous. The steam is provided preferably at a pressure which is above the pressure at which the shift reaction is taking place which is preferably about 40 bar. If the molar steam to carbon monoxide ratio of 2.5 is used a surplus of 1.5 moles steam for every mole carbon dioxide remains in the reactor. This results in large amounts of water in the product gas of the CO shift reaction. When this product gas is cooled this leads to a considerable amount of condensing and, thus, so large amounts of low level heat in the cooling train, while the product gas is cooled to ambient temperature. The majority of this energy is usually discarded which results in a low energy efficiency.

The raw syngas 301 generated by the gasification unit 300 is introduced into a high-pressure scrubbing unit 502. The high-pressure scrubbing unit 502 is a conventional wet scrubber unit in which e.g. higher hydrocarbons are removed from the raw syngas 301. The high-pressure scrubbing unit 502 is fed with feed water 503 which is the condensed water 508 from a low temperature heat recovery which will be described later on. Water 505 which is collected in a sump 504 of the high-pressure scrubbing unit 502 is conveyed by conveying means 506 to a bleed water conduit 507. Excess condensed water 508 which is not needed as feed water 503 is conveyed to the bleed water conduit 507 as well. Cleaned syngas 509 generated in the high-pressure scrubbing unit 502 is provided downstream of the high-pressure scrubbing unit 502 to a first heat exchanger 518. The term conveying means within this document is understood as a pump and/or a compressor. Simultaneously to the cleaning of the raw syngas 301 in the high-pressure scrubbing unit 502 the moisture of the cleaned syngas 509 can be controlled.

The torrefaction syngas 401 being generated in the torrefaction gas processing unit 400 is conveyed to a saturation column 510 via a conveying means 511. By the conveying means 511 the torrefaction syngas 401 is compressed, preferably to a pressure of 40 bar. The conveying means 511 can comprise several compressors with intercoolers which provide for a multistage intercooled compression of the torrefaction syngas 401. Likewise, the purge gas 602 from the gas cleaning unit 600 is conveyed via a conveying means 512 to the saturation column 510 as well. By the conveying means 512 the purge gas 602 is compressed, preferably to a pressure of 40 bar. The conveying means 512 can comprise several compressors with intercoolers which provide for a multistage intercooled compression of the purge gas 602. The saturation column 510 is a conventional wet scrubber which is provided with process water 513 from a low temperature heat recovery unit 524 being described later on via conveying means 514. The water 515 collected in a sump 516 of the saturation column 510 is used as process water in a low temperature heat recovery unit 524 described below. By the saturation column 510 the torrefaction syngas 401 and the purge gas 602 are mixed and, simultaneously, moisture is added to the resulting saturation column product gas 517. Depending on the parameters of the operation of the saturation column, i.e. in particular the water flow and the temperature of the water, the moisture of the saturation column product gas 517 can be controlled.

The saturation column product gas 517 is provided together with the cleaned syngas 509 to a first heat exchanger 518. In the first heat exchanger 518 energy is transferred from a high temperature CO shift reactor offgas 519 to the cleaned syngas 509 and the saturation column product gas 517 which are combined downstream of the first heat exchanger 519 to a combined syngas stream 520. By the heat exchange in the first heat exchanger 518 the respective high temperature CO shift reactor offgas 519 is cooled while the cleaned syngas 509 and the purified gas stream 517 are heated. Preferably, the saturation column 510 is driven in such a way that the combined syngas stream 520 has a molar ratio of water steam to carbon monoxide of between 2.0 and 3.0, preferably between 2.4 and 2.6, in particular of about 2.5.

The combined syngas stream 520 is provided downstream of the first heat exchanger 518 to a high temperature CO shift reactor 521 in which the above-described shift reaction is taking place. The high temperature CO shift reactor offgas 519 has a reduced water/steam and carbon monoxide content and an increased hydrogen ($H_2$) content compared to the combined syngas stream 520. The high temperature CO shift reactor offgas 519 is—as will be described in the following—guided through several heat exchangers to reduce its temperature including the first heat exchanger 518 to a low temperature CO shift reactor 522 in which the CO shift reaction as described above is taking place. A low temperature CO shift reactor offgas 523 is increased in its hydrogen ($H_2$) content compared to the high temperature CO shift reactor offgas 519 that is entering the low temperature CO shift reactor 522.

The low temperature CO shift reactor offgas 523 is guided downstream of the low temperature CO shift reactor 522 through a low temperature heat recovery unit 524. In this low temperature heat recovery unit 524 the heat content of the low temperature CO shift reactor offgas 523 is used to increase the temperature of several water streams. After entering the low temperature heat recovery unit 524 the low temperature CO shift reactor offgas 523 is subsequently guided through a second heat exchanger 525, a third heat exchanger 526, a fourth heat exchanger 527, a fifth heat exchanger 528 and a sixth heat exchanger 529. While passing these heat exchangers 524, 525, 526, 527, 528, 529 the temperature of the low temperature CO shift reactor offgas 523 is reduced steadily before leaving the low temperature heat recovery unit 524 as a syngas stream 530 and is passed, optionally and if necessary, through an air cooler 531. Thereafter, the syngas stream 530 is provided to the gas cleaning unit 600 as discussed above.

First, in the second heat exchanger 525 the heat content of the syngas stream 530 is used to heat feed water 508 to be used in the gasification unit 300. E.g. it is thus possible to heat this water 508 from 158° C. to 205° C. Second, in the third heat exchanger 526 water is heated that can e.g. be used to generate high pressure steam. The water is e.g. heated from typically 155 to 200° C. Third, in the fourth heat exchanger 527 process water 513 is heated, typically from 135 to 158° C., which is used in the saturation column 510. Further use of this water as feed water 508 is possible, in particular after passing the second heat exchanger 525. In the fourth heat exchanger 527 the low temperature CO shift reactor offgas 523 is cooled below its dew point, thus, large amounts of condensing heat are released and used for the respective heat transfer. Fourth, in the fifth heat exchanger 528 boiler feed water 536 is heated, typically from 35° C. to 155° C., which is preferably used to prepare high pressure steam. Fifth, in the sixth heat exchanger 529 water is heated from typically 25° C. to 135° C. for use in the gasification of the charred pellets 201 in the gasification unit 300.

The feed water 508 for the gasification unit 300 is at least a part of the water 515 collected in the sump 519 of the saturation column 510 as described above. The water 515 collected in the sump 516 of the saturation column 510 is entering the fourth heat exchanger 527. Water 521 from a waste water treatment unit (not shown) can be mixed with the water 515 after having passed the sixth heat exchanger 529. Downstream of the second heat exchanger 527 the heated fourth heat exchanger water offstream 533 is in part used as process water from low temperature heat recovery 513 in the saturation column 510 and in part it is guided through the second heat exchanger 525 to be used downstream of the second heat exchanger 525 partly as condensed water 508 to be used partly as feed water 503 in the high-pressure scrubbing unit 502 and partly as process water in the torrefaction unit 200. A further part of water downstream of the sixth heat exchanger 529 is used as condensate 534 provided e.g. to a water stripper. Other water like e.g. external high pressure boiler feed water 535 generated for applications outside the plant 1 is guided through the fifth heat exchanger 528 to be partly used as boiler feed water 536 e.g. in the gasification unit 300 and/or for the generation of low pressure steam and/or in the torrefaction unit 200.

Another part of the boiler feed water 535 is guided downstream the fifth heat exchanger 528 through the second heat exchanger 526. Thereafter, it is passed through a seventh heat exchanger 537.

The CO shift unit 500 as part of the plant 1 for conversing solid waste into a product gas stream comprising hydrogen allows an energy efficient use of the low temperature heat energy in the low temperature heat recovery unit 524 to heat process water streams used in the plant 1.

Figure 7:
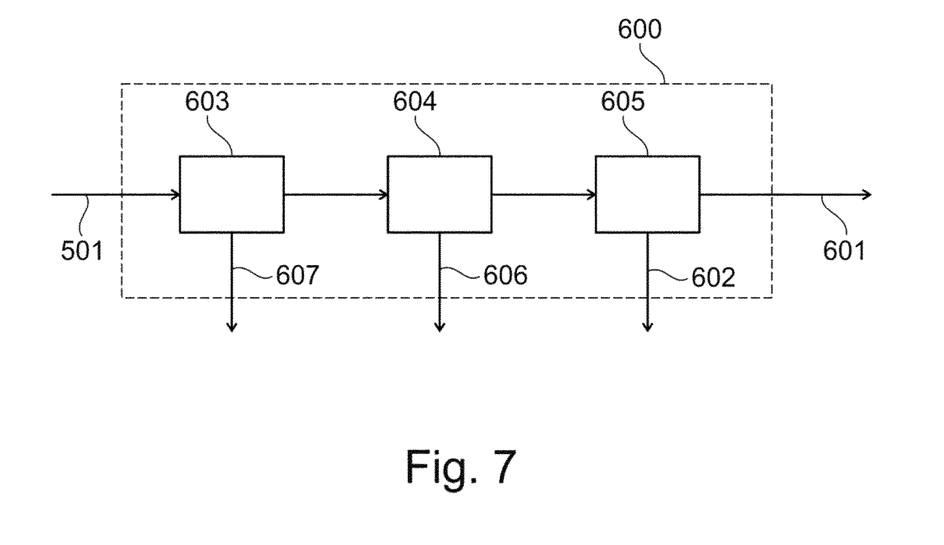
FIG. 7 a gas cleaning unit.

FIG. 7 displays the gas cleaning unit 600 in greater detail. The shifted syngas 501, which is the output of the CO shift unit 500, is introduced into the gas cleaning unit 600 and passes, subsequently, hydrogen sulfide absorption means 603 and carbon dioxide absorption means 604. Thereafter, it passes the pressure swing adsorption means 605 wherein, by pressure swing adsorption, the product gas stream 601 rich in hydrogen, preferably pure hydrogen, with a hydrogen content of at least 99.5 vol.-% is generated. Frequently, the single adsorbers of the pressure swing adsorption means 605 are purged with hydrogen, generating the purge gas 602.

The hydrogen sulfide collected in the hydrogen sulfide adsorption means 603 is used to generate sulphur 606 by a Claus process. The carbon dioxide 607 which is absorbed in the carbon dioxide absorption means 603 can be extracted therefrom and used in other processes.

The method and plant 1 for conversing solid recovered fuel pellets 117 made from municipal solid waste 103 allow the transformation of the municipal solid waste 103 into hydrogen with a high yield instead of landfilling or incinerating the municipal solid waste 103. The hydrogen rich product gas stream 601 can be used as feedstock for chemical reactions or for storing energy in a releasable manner.

REFERENCE NUMERALS 1 plant for conversing solid waste into a gas comprising hydrogen
100 pelletizing facility
102 shredder
103 solid waste
104 shredded solid waste
105 first metal removal unit
106 iron residues
107 dryer
108 water
109 second metal removal unit
110 metal residues
111 further residues
112 density classifier
113 pre-cleaned material stream
114 first mill
115 milled material stream
116 pellet press
117 solid recovered fuel pellet
118 kiln
119 washing column
120 heat pump
121 radiator
122 dryer air inlet
123 radiator air inlet
124 radiator air outlet
125 kiln air inlet
126 kiln air outlet
127 washing column air inlet
128 washing column air outlet
129 dryer air outlet
130 recirculation line
131 washing column water outlet
132 first heat pump inlet
133 first heat pump outlet
134 washing column water inlet
135 second heat pump outlet
136 radiator water inlet
137 radiator water outlet
138 second heat pump inlet
139 second magnet
200 torrefaction unit
201 charred pellets
202 torrefaction gas
203 furnace
204 second mill
205 third metal removal unit
206 metal residues
207 coarsely milled charred pellets
208 third mill
209 finely milled charred pellets
300 gasification unit
301 raw syngas
302 entrained flow gasifier
303 feedstock
304 biomass
305 fourth mill
306 finely milled biomass
307 oxygen rich gas stream
308 intermediary product gas
309 quench zone
310 quench water
311 slag
312 raw syngas
313 water washing cooling column
314 water
315 excess bleed water
316 make up water
400 torrefaction gas processing unit
401 syngas
402 burning chamber
403 fuel gas
404 oxygen rich gas stream
405 burning chamber exit
406 recycled syngas
407 syngas
408 mixing chamber
409 quenched syngas
410 heat recovery system
411 thermal carrier
412 boiler feed water
413 high-pressure steam
414 fourth heat exchanger
415 low-pressure steam
416 superheated low-pressure steam
417 wet scrubbing system
418 used washing water
419 sump
420 cleaned syngas
421 head
422 two stage water washing cooling column
423 compressor
424 remaining part of the cleaned syngas
425 sump
426 washing water
427 heat pump
428 first stage
429 second stage
430 air cooler 431 excess washing water
432 make up water
433 bleed water
434 syngas conveying means
435 flare
436 first inlet
437 second inlet
438 third inlet
439 quench zone
440 quench zone inlet
441 first heat exchanger
442 second heat exchanger
443 superheater
500 CO shift unit
501 shifted syngas
502 high-pressure scrubbing unit
503 feed water
504 sump
505 water
506 conveying means
507 bleed water conduit
508 condensed water
509 cleaned syngas
510 saturation column
511 conveying means
512 conveying means
513 process water from low temperature heat recovery
514 conveying means
515 water
516 sump
517 saturation column product gas
518 first heat exchanger
519 high temperature CO shift reactor offgas
520 combined high temperature syngas stream
521 high temperature CO shift reactor
522 low temperature CO shift reactor
523 low temperature CO shift reactor offgas
524 low temperature heat recovery unit
525 second heat exchanger
526 third heat exchanger
527 fourth heat exchanger
528 fifth heat exchanger
529 sixth heat exchanger
530 syngas stream
531 air cooler
532 waste water treatment unit
533 fourth heat exchanger water offstream
534 condensate
535 high pressure boiler feet water
536 boiler feed water
537 seventh heat exchanger
538 saturation column product gas
600 gas cleaning unit
601 product gas rich in hydrogen
602 purge gas
603 hydrogen sulfide absorption means
604 carbon dioxide absorption means
605 pressure swing adsorption means
606 sulphur
607 carbon dioxide

The invention claimed is:

1. A method for processing solid recovered fuel pellets (117), comprising the following steps:
   a) torrefaction of the pellets (117) at a torrefaction temperature of 250 to 300° C. generating charred pellets (201) and torrefaction gas (202);
   b) milling the charred pellets (201) in a first milling step to coarsely milled charred pellets (207);
   c) removing metal residues (206) from the coarsely milled charred pellets (207);
   d) milling the coarsely charred pellets (207) to finely milled charred pellets (209);
   e) gasifying the finely milled charred pellets (209) to raw syngas (301) in an entrained flow gasifying process;
   f) performing CO shift reactions to the raw syngas (301) creating shifted syngas (501);
   g) removing carbon dioxide and hydrogen sulfide from the shifted syngas (501) creating a syngas; and
   h) generating a product gas stream (601) rich in hydrogen by purifying the syngas.

2. The method according to claim 1, wherein the torrefaction gas (202) generated in step a) is thermally cracked for the generation of a torrefaction syngas (401), said torrefaction syngas (401) being mixed with the raw syngas (301) generated in step e) before step f).

3. The method according to claim 1, wherein in step b) the charred pellets (201) are milled to a particle size of 10 mm or less.

4. The method according to claim 1, wherein in step c) the metal residues (206) are removed using an eddy current technology.

5. The method according to claim 1, wherein in step d) the coarsely milled charred pellets (207) are milled to a particle size of 500 μm [micrometer] or less.

6. The method according to claim 1, wherein in step h) carbon dioxide ($CO_2$) and hydrogen sulfide ($H_2S$) are removed from the syngas by adsorption.

7. The method according to claim 1, wherein in step h) hydrogen is separated from the syngas using a pressure swing adsorption system creating the product gas stream rich in hydrogen (601) and a purge gas (602).

8. The method according to claim 7, wherein at least a part of the purge gas (602) is provided to the CO shift reaction in step D.

9. The method according to claim 7, wherein a part of the purge gas (602) is used as fuel gas.

* * * * *

UNITED STATES PATENT AND TRADEMARK OFFICE
CERTIFICATE OF CORRECTION

| | |
|---|---|
| PATENT NO. | : 11,952,277 B2 |
| APPLICATION NO. | : 18/250458 |
| DATED | : April 9, 2024 |
| INVENTOR(S) | : Johannes Theodorus Gerardus Marie Eurlings |

It is certified that error appears in the above-identified patent and that said Letters Patent is hereby corrected as shown below:

In the Claims

Column 16, Line 51 (Claim 8), please change "step D" to --step f)--.

Signed and Sealed this
Twenty-first Day of May, 2024

Katherine Kelly Vidal
*Director of the United States Patent and Trademark Office*